Oct. 12, 1926.
W. H. ROBBINS
1,602,505
STEEL WOOL CLEANING MACHINE
Filed Nov. 7, 1924
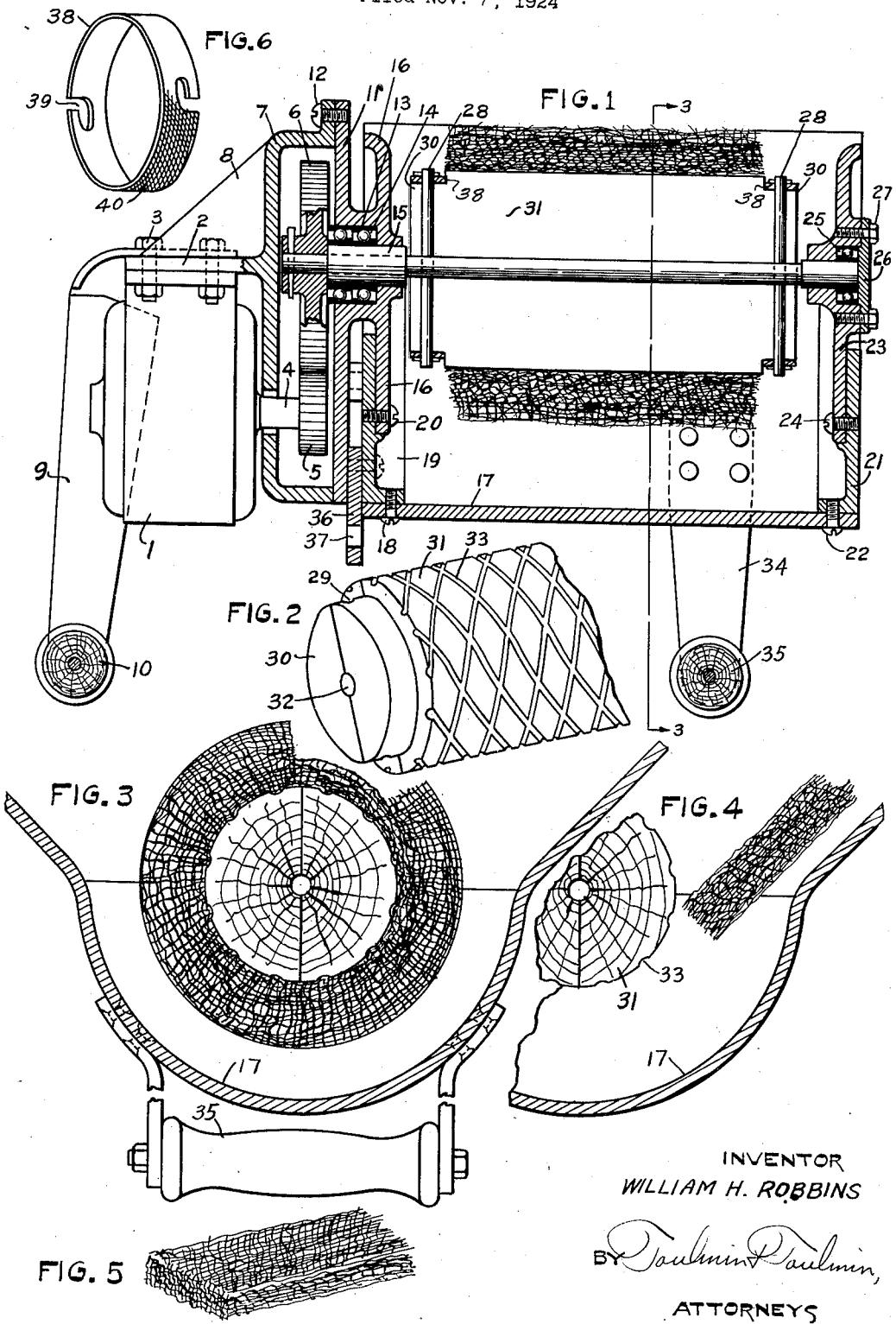
INVENTOR
WILLIAM H. ROBBINS
BY Toulmin Toulmin,
ATTORNEYS Patented Oct. 12, 1926.

1,602,505

UNITED STATES PATENT OFFICE.

WILLIAM H. ROBBINS, OF SPRINGFIELD, OHIO, ASSIGNOR TO THE WILLIAMS COMPANY, OF LONDON, OHIO, A CORPORATION OF OHIO.

STEEL-WOOL-CLEANING MACHINE.

Application filed November 7, 1924. Serial No. 748,431.

My invention relates to a cleaning and polishing machine and in particular one using steel wool.

It is the object of my invention to provide a method and means of utilizing steel wool for a cleansing and polishing agent for particular use in connection with cleaning of buildings and the like.

It is my object to form the steel wool into blankets and apply these blankets to detachable spindles in a permanent machine of such a portable character that it may be transported on scaffolding or by other means adjacent the surfaces of buildings and the like to clean them.

It is an additional object to use such a machine and method for the cleansing of other materials and other types of surfaces.

It is a further object to provide a machine which may be handled by one or two men in which the wood blanket may be renewed at will without special tools.

It is a further object to provide a machine which will admit of the application of the blanket of wool to the surfaces to be cleaned at high speed while still protecting the operators.

It is an object to make the machine light enough for hand use, yet powerful enough and rigid enough for the purposes desired.

Referring to the drawings:—

Figure 1 is a section through a portion of the machine disclosing this construction and method of operation;

Figure 2 is a perspective of one end of the spindle without the steel wool blanket;

Figure 3 is a section on the line 3—3 of Figure 1 with the wool blanket applied;

Figure 4 is a fragmentary section showing the wool blanket just prior to being applied;

Figure 5 is a perspective of the wool blanket; and

Figure 6 is a perspective of the locking ring for locking the halves of the spindle together.

Referring to the drawings in detail, 1 is a motor suspended from the bracket or plate 2 by the bolts 3. This motor has mounted on its armature shaft 4 a pinion 5 meshing with a larger gear 6. This larger gear bears a relationship to the smaller gear of three and a half to one. A gear ratio of two and a half to one may be employed if desired. The two gears are mounted within a gear housing 7 of which the bracket 2 is a part. The bracket 2 is provided with a strengthening rib 8 which is also a part of the gear housing 7. To this bracket is attached an outwardly and downwardly extending arm 9 consisting of spaced members having a handle 10 therebetween.

The gear casing 7 is closed by the plate 11 which is attached thereto by a plurality of spaced screws 12. This plate has a recess 13 for the reception of ball bearings 14 which support the shaft 15 upon which is mounted the gear 6. This shaft also passes through the end plate 16 which carries the trough or shield 17. This shield is bolted by the bolts 18 to the plate 19 which in turn is bolted by the bolts 20 to the plate 16.

The other end of the trough has mounted thereon a semi-circular ring 21 connected thereto by the bolts 22. This ring 21 carries the bearing plate 23 bolted thereto by the bolts 24. The bearing plate 23 carries the other end of the shaft 15 in the ball bearings 25. On the outer side of the bearing plate 23 is a thrust plate 26 bolted thereto by the bolts 27.

The shaft 15 has a pair of spaced transverse spindle locking pins 28. These pins fit in grooves 29 in the end of the hubs 30 of the spindle halves 31. The spindle halves are provided with a longitudinal cut away portion 32 for the reception of the shaft 15. The outer surface of the spindles 31 are corrugated with the grooves 33 which are disposed at an angle to one another to cause the steel wool to firmly adhere to the spindles which are preferably of wood.

The shield 17 is provided with brackets 34 with a handle 35 therebetween to assist in handling the machine.

Between the gear housing and the semi-circular ring 19 are provided plates 36 with the eyes at spaced intervals, one of which is shown at 37, in order to permit of supporting cables or yokes to be attached to the cleaning machine to assist in supporting it. If desired, certain counter-balancing weights and mechanism may be attached thereto so that the operator has only to swing the machine and apply it to the surface to be dressed.

In order to hold the halves of the spindles together, the locking ring 38 is provided with bayonet joint slots 39. The ring itself has a knurled surface. This surface is designated 40.

In practice the ring is slipped over the hub 30 of the spindles and turned so that the ends of the ridges 29 are inserted in the slots 39 thus locking the halves together.

It will be understood that I desire to comprehend within my invention such modifications as will be necessary to adapt it to varying conditions of use.

Having thus fully described my invention, what I claim as new and desire to secure by Letters Patent, is:—

1. In a machine for utilizing steel wool for cleaning purposes, a gear casing, an arm, a depending handle mounted thereon, a motor suspended between the casing and the handle beneath said arm, gearing in said gear casing, a shaft journalled therein adapted to be driven by the gearing, a supporting plate attached to said gear casing, a second supporting plate remote from said gearing for the other end of the shaft, means to interconnect said plates, a handle carried by said means, and a spindle on said shaft adapted to carry a blanket of steel wool.

2. In a machine for utilizing steel wool, a gear casing supporting a motor and gearing, a handle supported by said gear casing, a shield supported by said gear casing, an end plate supported by said shield, a shaft supported in said end plate at one end and in said gear casing at the other and connected to said gearing, a blanket of steel wool, a spindle mounted on said shaft having means to cause the blanket of steel wool to adhere thereto, said shield having an open portion, the walls of which are substantially on a level with the surface of the wool blanket to permit it to be applied to a surface to be cleaned.

In testimony whereof, I affix my signature.

WILLIAM H. ROBBINS.